(12) United States Patent
Duden

(10) Patent No.: US 7,578,482 B2
(45) Date of Patent: Aug. 25, 2009

(54) CATALYZED DECOMPOSING STRUCTURAL PAYLOAD FOAM

(75) Inventor: Quenten E. Duden, Tucson, AZ (US)

(73) Assignee: Raytheon Company, Waltham, MA (US)

(*) Notice: Subject to any disclaimer, the term of this patent is extended or adjusted under 35 U.S.C. 154(b) by 533 days.

(21) Appl. No.: 10/920,976

(22) Filed: Aug. 18, 2004

(65) Prior Publication Data

US 2006/0038085 A1 Feb. 23, 2006

(51) Int. Cl.
*B64G 1/36* (2006.01)

(52) U.S. Cl. .............. 244/171.7; 244/173.1; 244/173.3; 428/305.5; 252/363.5; 401/96

(58) Field of Classification Search .............. 244/158.1, 244/171.7, 173.1, 173.3; 428/305.5, 304.4, 428/307.3, 423.1, 436; 401/96
See application file for complete search history.

(56) References Cited

U.S. PATENT DOCUMENTS 3,863,254 A   1/1975   Turner
4,076,655 A   2/1978   Finberg
2002/0109047 A1   8/2002   Draisey et al.

FOREIGN PATENT DOCUMENTS

GB   1430085   3/1976

OTHER PUBLICATIONS

US 5,584,866 03/1999, Kroll. (withdrawn).

*Primary Examiner*—J. Woodrow Eldred
(74) *Attorney, Agent, or Firm*—David W. Collins

(57) ABSTRACT

A high energy, e.g., ultraviolet (UV), catalyzed decomposing foam encapsulating a payload to be boosted in space provides an ultra-light weight, adaptable means to facilitate survival of much lighter, smaller satellites and space hardware under boost environment. The decomposable foam is to contain multiple satellites within a booster payload in lieu of the traditionally heavy and complex structural framework. The catalyzed decomposing foam significantly lowers the weight and structure of all space hardware. This packaging system is especially beneficial where several or even hundreds of satellites are required for a constellation system, thereby significantly benefiting all technologies applied in space, ranging from the telecommunication industry to DOD applications. In addition to weight and cost savings, advantages of this foam are many in that it is adaptable to any payload shape as it may be injected, sprayed, formed, molded, easily cut or manufactured to support any geometry required.

30 Claims, 2 Drawing Sheets

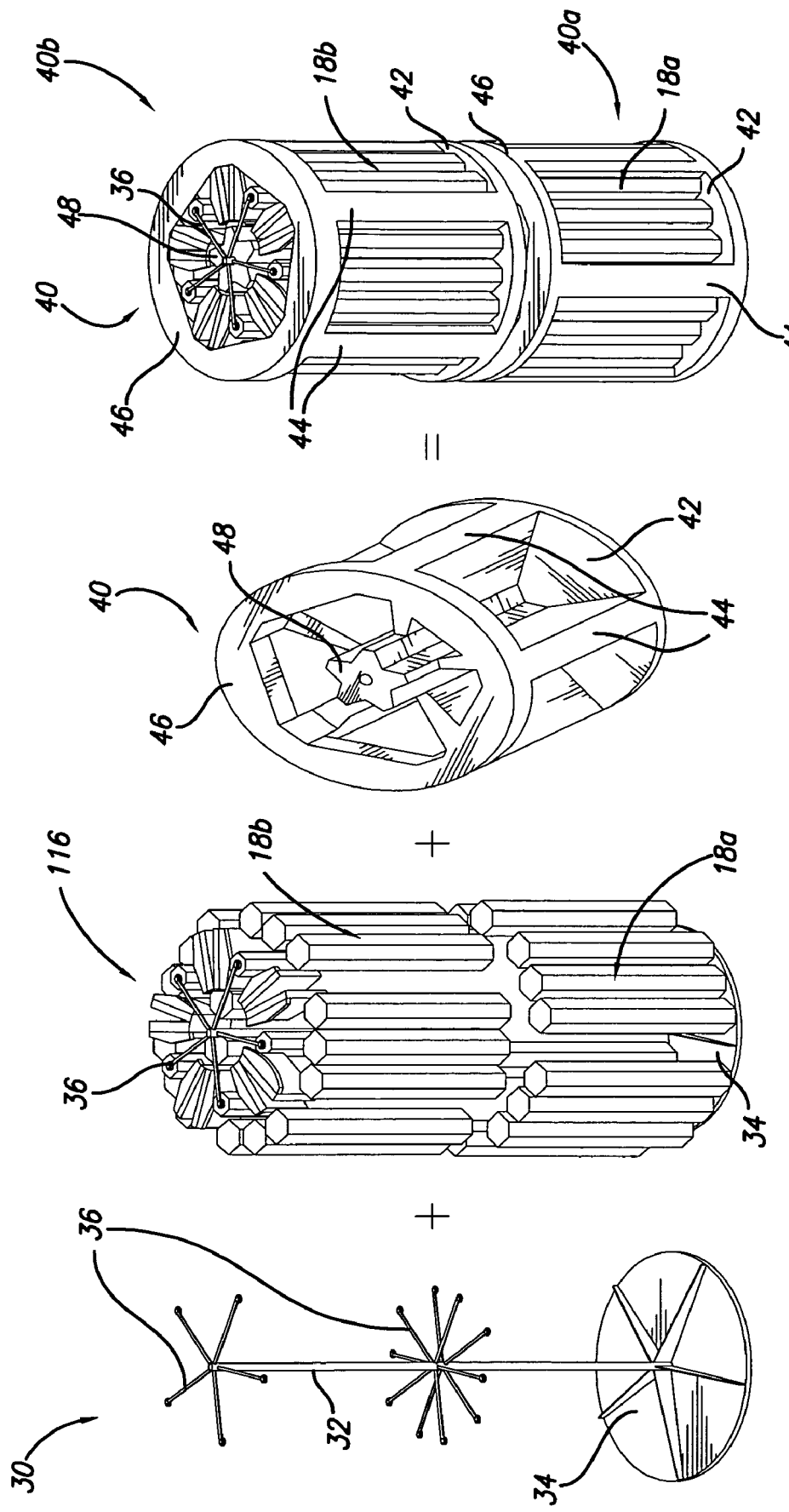

CATALYZED DECOMPOSING STRUCTURAL PAYLOAD FOAM

TECHNICAL FIELD

The present invention relates generally to boosting payloads into orbit, and, more particularly, to the use of decomposable structural payload foam for supporting the payloads.

BACKGROUND ART

Space missions and their hardware design are compromised by conflicting requirements. In order to escape the earth's gravitational pull, an extreme amount of force and energy is required to place space hardware in orbit. Intrinsically, these high forces and energies are attenuated to the payload. Once in orbit, the vacuum of space exhibits a relatively small structural mechanical environment. Consequently, space hardware is designed with significant strength to survive the boosting environment that is unnecessary while in orbit. This "over design" results in space hardware that is structurally strong and heavy.

Additionally, in effort to save the number of orbital launches and thereby mission cost, engineers often design booster payloads to deliver several satellites at once. To do this, structural "busses" or "trees" are designed to hang the satellites on while under the boost load. Because of the harsh booster environment, these busses are strong and heavy, performing a very limited and crucial mission before being ditched and destroyed in atmosphere. A subsequent problem is the amount of hardware left as space debris these traditional solutions deploy.

Currently, space payloads are designed with following principles: space-bound payloads must survive the boosting environment typically exceeding 10 Gs axial at 10 Hz continuous and synchronous with elevated temperatures. Payload support structures must be designed to survive the temperature and chemical extremes of space. Payload support structures must be designed in such a way as to not obstruct the functional hardware on the satellite or satellite bus (where the term "bus" is used to describe the payload structure that carries several satellites or satellite components into orbit). The resulting large and geometrically inefficient designs are left as over-massed structures in space, providing little or no value in the mechanically benign environment of space. In addition, such designs are bulky and expensive, leading to two historic prominent issues. First, weight is money for orbital launches; therefore, bulk is expensive. Second, space components have a limited life usage, and when the components are no longer useful, the result is bulk left in space. In the last twenty years, scientists have studied the effects of space debris as a result of old satellites and have contended that this is a serious threat to the ability to field new hardware into desirable orbits.

Currently, the sublimating foam industry is limited to decomposing packaging materials used to protect earth-bound payloads against the physical environment of transportation. Recently, environmental pressures have mandated that organic foams such as polystyrene not only decompose in atmosphere but also under water and soil, where there are limited oxygen molecules available. For this reason, recent efforts have been made to coat packaging materials with oxidizers that require very little light or heat to release and attack the foam.

Thus, what is needed is a solution that protects payloads, i.e., space hardware during launch, but is disposable once the payload is in space.

DISCLOSURE OF INVENTION

In accordance with an aspect of the present invention, a decomposable foam is used to protect the payload during launch. Once in space, the decomposable foam, which at least partially surrounds the payload, is decomposed by exposure to high energy electromagnetic radiation.

Further in accordance with another aspect of the present invention, a payload for launching into space by a vehicle is provided, wherein the payload is contained within the vehicle and is at least partially surrounded by the decomposable foam.

Still further in accordance with yet another aspect of the present invention, a vehicle for launching a payload into space is provided, wherein the payload is protected within the vehicle against launching forces by the decomposable foam that at least partially surrounds the payload.

Yet further in accordance with an aspect of the present invention, a method is provided for protecting a payload during launch into space. The method comprises:

at least partially surrounding the payload with the decomposable foam; and decomposing the foam once the payload is in space by exposure to high energy electromagnetic radiation.

BRIEF DESCRIPTION OF THE DRAWINGS

FIGS. 4A-4D depict a light bus structure in accordance with an embodiment of the present invention (FIG. 4A), a satellite array (FIG. 4B), a sublimating structural payload foam (FIG. 4C), and the combined assembly of the three components (FIG. 4D).

BEST MODES FOR CARRYING OUT THE INVENTION

Figure 3:
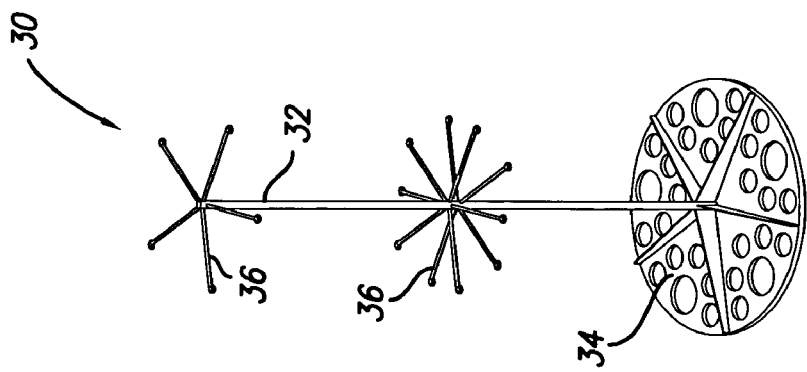
FIG. 3 is a perspective view of an embodiment of a space-launched payload structure employed in the practice of the present invention.

In accordance with the present invention, an ultraviolet (UV) catalyzed sublimating foam encapsulating a payload to be boosted in space provides an ultra lightweight, adaptable means to facilitate survival of much lighter, smaller satellites and space hardware under boost environment. Decomposable foam is used to contain multiple satellites within a booster payload in lieu of the traditionally heavy and complex structural framework. The UV catalyzed decomposing foam significantly lowers the weight and structure of all space hardware. This packaging system is especially beneficial where several or even hundreds of satellites are required for a constellation system, thereby significantly benefiting all technologies applied in space, ranging from the telecommunication industry to DOD applications. In addition to weight and cost savings, advantages of this foam are many in that it is adaptable to any payload shape, since it can be injected, sprayed, formed, molded, easily cut or manufactured to support any geometry required.

Organic foam that is doped to abate and attenuate specific environmental frequencies may be employed in order to successfully support space hardware being boosted into orbit. Further, structural media (e.g., glass, metal flakes, fibers, plastics, rubber, etc.) may be embedded within the decomposing foam in order to optimize the foam to the environment that it will be exposed to.

Once in orbit, the payload shroud opens, thus exposing this structural payload foam to the intense high energy, e.g., UV, environment of space. This UV energy catalyzes the decomposition of the foam, thereby exposing much lighter hardware optimized for the vacuum of space. The foam may be designed to accentuate the natural tendencies of photo-initiated reactions in that they occur with most volatility against low wave UV (<290 nm) readily available in space and naturally filtered by ozone. This natural characteristic adds value in that the material is stable while being produced and processed on earth while sublimating or decomposing when exposed to the space UV environment.

As described herein, the foam is decomposable by high energy electromagnetic radiation, preferably UV radiation, typically less than about 1,000 nm (1 µm or $10^{-6}$ meters) and preferably less than about 100 nm ($10^{-7}$ meters). In a preferred embodiment, the high energy comprises low wave UV, less than 290 nm. While the description is given in terms of UV radiation, those skilled in this art will appreciate that higher energies, including, but not limited to, X-rays, gamma rays, and cosmic rays, may also be employed in decomposing the foam.

Several materials are available to choose from for the development of UV catalyzed sublimating structural foams. Currently, industry uses short chain (plastics) and long chain (rubber) polymers, vinyl chlorides, and poly-carbons as UV reactive bases. The unique properties of these materials, such as strength, toughness, and tear resistance, arise because of the very high molecular weight of the molecules, which are held together by chemical (covalent) bonds between the atoms. An ordinary polyethylene film has a molecular weight around 300,000. By way of comparison, carbon dioxide and water have molecular weights of 44 and 18, respectively. By definition, the degradation of a polymer such as polyethylene results from the breaking of carbon bonds in each molecule, with the concomitant lowering of the molecular weight and a loss of mechanical properties, such as tensile strength, toughness, and percentage of elongation. Accordingly, products containing decomposable additives have thus exhibited a substantial decrease of molecular weight from one quarter million to an average of less than 4,000, leading to the rapid breakdown of the material. The effect of this molecular breakdown is an exothermic reaction, thus preserving the conservation of mass and energy governing the science. Examples of suitable organic foam bases include, but are not limited to, expanded or extruded polystyrenes, polyethylenes, polypropylenes, propylene copolymers, and polyurethanes.

A number of factors can initiate the degradation of degradable polythene packaging, such as ultraviolet light, heat, oxygen, and film stress (such as pulling and tearing). Once degradation is initiated, it must continue. Generally, oxygen is required in the catalyzed event; however, recently scientists have substituted atmosphere with peroxides contained within the foam substance to accelerate the process independent of atmosphere. The eventual result of the degradation is the release of alcohols, carbon dioxide and water (post-reactive by-products). The by-products of the post reaction foam ensure that no harmful films or debris would be left on space hardware.

A simple example of such a reaction can be expressed with the example of the creation of ozone. Ozone is an excellent oxidizer and will aggressively attack organic foams. Ozone can be formed when a mixture of $O_2$ and $NO_2$ is exposed to bright light:

A single oxygen atom (O•) is formed as an intermediate in this process that is extremely reactive and readily attaches to any scavenging molecule. In the case of atmosphere, it attaches with readily available $O_2$, thereby forming ozone, $O_3$. This is one simple example of a light-irradiated chemical reaction. Equally as simple and directly applicable is the UV light-synthesized reaction of ozone and carbon dioxide molecules disassociating under low frequency wavelengths. This fundamental chemical rule is the key to releasing oxygen molecules that will attack and break down the foam. In one embodiment, the foam is embedded with an oxidizer, or free radical initiator, that would be energized by low wave (less than 290 nm) UV radiation. Once the UV energy has released the oxidizer in the form of a free radical, the absence of $O_2$ or other scavengers in space insures these free radicals will continue to attack the only available scavenging molecule; the foam.

Two chemicals and their common compounds qualify as readily available oxidizers that can be effectively released via UV light to break down organic foams; these are oxygen and fluorine. Examples of the resulting chemical compounds, i.e., free radical initiators, that may be used to decompose the foam include, but are not limited to, aluminum oxide, hydrogen peroxide, sulfur trioxide, sulfur fluoride, nitrous oxide, benzil dimethyl ketal, trimethylbenzophenone, α-hydroxy ketone, benzophenone, benzoyl peroxide, di-iso-propyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-dihydroperoxide, tert-butyl hydroperoxide-90, ammonium persulfate, potassium persulfate, azo compounds such as 2,2'-azobisiso-butyronitrile, 4,4'-azobis(cyclohexanecarbonitrile), 4,4'-azobis(4-cyanovaleric acid) and 2,2'-azobis(2-methylpropane), TRIGONOX 21 (tert-butyl peroxy-2-ethylhexanoate, available from Akzo & Nobel), and PERKADOX 16 (di(tert-butylcyclohexyl)peroxydicarbonate, available from Akzo & Nobel), and organic peroxides such as dicumyl peroxide, dioctanoyl peroxide, dimyristyl peroxide, dilauroyl peroxide, 1,1-di(tert-butylperoxycyclohexane), tert-butyl peroxydiethylacetate, and cumyl hydroperoxide. Most preferable are benzoyl peroxides for providing the release of free radical initiators.

The foam is doped to abate and attenuate specific environmental frequencies in order to successfully support space hardware being boosted into orbit. Once in orbit, the payload shroud would open, thereby exposing the foam to the intense UV environment of space. This UV energy would catalyze the decomposition of the foam, thereby exposing much lighter hardware optimized for the vacuum of space. As mentioned earlier, gamma, X-rays, and cosmic rays may also be used to catalyze the decomposition of the foam.

The ultra-violet (UV) catalyzed decomposing foam encapsulating a payload to be boosted in space provides an ultralight weight, adaptable means to facilitate survival of much lighter, smaller satellites and space hardware under boost environment. Decomposable foam could be used to contain multiple satellites within a booster payload in lieu of the traditionally heavy and complex structural framework. UV catalyzed decomposing foam significantly lowers the weight and structure of all space hardware. This packaging system is especially beneficial where several or even hundreds of satellites are required for a constellation system, thereby significantly benefiting all technologies applied in space, ranging from the telecommunication industry to DOD applications. In addition to weight and cost savings, advantages of this foam are many in that it is adaptable to any payload shape as it may be injected, sprayed, formed, molded, easily cut or manufactured to support any geometry required.

The use of decomposing foam has a number of other applications. For example, space agencies send payloads into space and maneuver them with gas thrusters. These thrusters require large tank reservoirs, which require insulation against the boost environment as they are delivered to orbit. Foam is a great insulator. Currently, these tanks are foam- and cork-insulated. Scientists have long desired to use the empty tanks as structural members in a space station. However, the foam insulation required to protect the tanks prohibits easy use of these tanks for structural members. The UV catalyzed sublimating/decomposing insulating payload media (foam) for space based components, as disclosed herein, would be an excellent fix for this problem. The foam would decompose once in space, exposing a useful structural member.

Alternatively, scientists have long desired to pitch boosting hardware (after completion of its mission) back through the earth's atmosphere, thereby causing it to burn and self-destruct. Because the current art of cork and foam thermal protection system (TPS) is designed to protect the booster components on the trajectory up, it continues its function on the way down, thus preventing this easy disposal method.

The result is excess space debris. A decomposing foam TPS would protect the booster components on the trajectory up until the near point of apogee, where it is exposed to the low wave light energy of space. There, the catalyzed event would eliminate the TPS, thereby exposing the raw hardware and thus facilitating safe "pitch and ditch" disposal of the used mission hardware.

Figure 1:
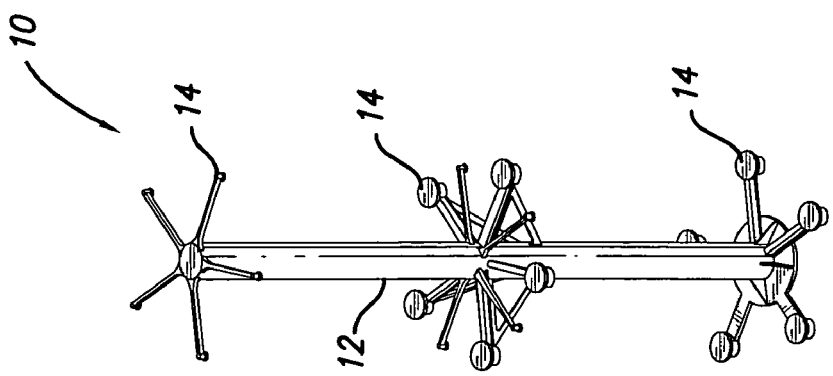
FIG. 1 is a perspective view of a prior art space-launched payload structure.

An example of a current space launched payload structure is illustrated in FIG. 1. There, the payload structure 10 comprises a tubular frame 12 and a plurality of cantilevered supports 14. The tubular frame 12 is heavy, and provides support for lateral loads due to the presence of a plurality of satellites (seen in FIG. 2). The cantilevered supports are also heavy, since they must bear the weight of the multiple satellites during liftoff. The weight of the payload structure 10 is on the order of 10,000 pounds.

Figure 2:
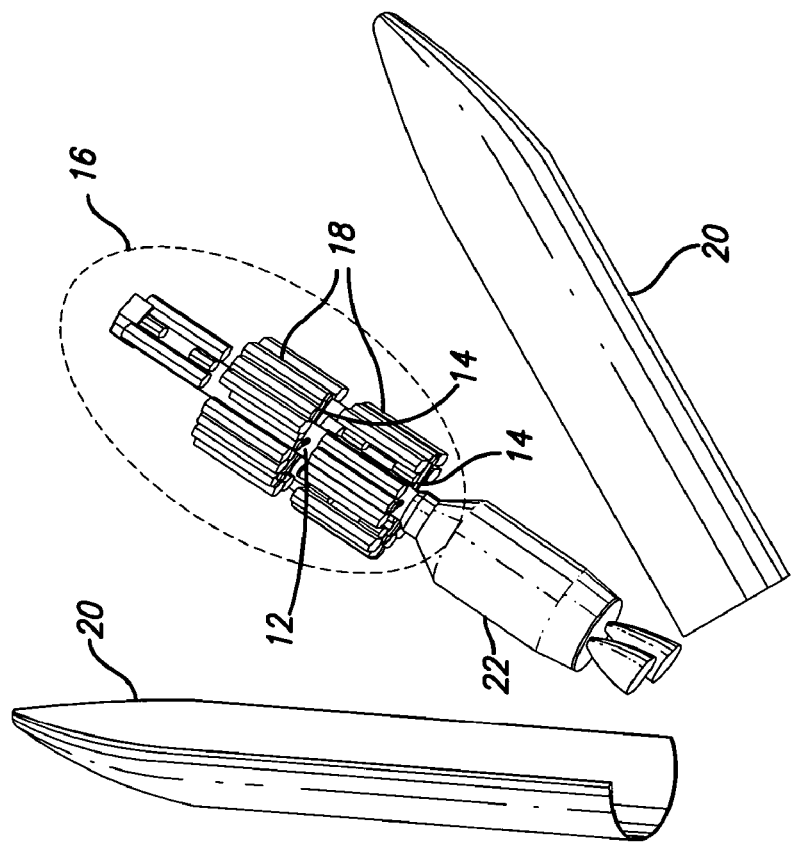
FIG. 2 is a schematic drawing of a space-launched payload bus with multiple satellites contained in a conventional launch vehicle.

The payload structure 10 in use is shown in FIG. 2, wherein a satellite bus 16 is shown, supporting multiple satellites 18. A clamshell shroud 20 surrounds the satellite bus during launch, and opens when deployment of the satellites 18 is desired. The satellite bus 16 is powered by a booster rocket 22 to reach the desired orbit, where the satellites 18 are deployed.

In accordance with the present teachings, a payload structure 30 is provided, as shown in FIG. 3. The payload structure 30 includes a mast 32 supported on a base 34. The mast 32 includes a plurality of release mechanisms 36.

The mast 32 does not serve as a frame 12, and is nowhere near as heavy. The base 34 may be solid or, to further reduce weight, perforated as shown. The release mechanisms 36 provide communication to the satellites 18 while in the supported position, but release the satellites upon signal from a control station (not shown). The weight of the payload structure 30 is on the order of 1,000 pounds, or an order of magnitude less than the prior art structure 10.

FIGS. 4A-4D illustrate the sequence of assembling the bus structure 30, satellites 18, and structural foam 40. The light bus structure 30 shown in FIG. 4A is the same as that depicted in FIG. 3, except that the alternative base 34, non-perforated, is shown. FIG. 4B depicts the plurality of satellites 18 mounted on the bus structure 30, forming a modified satellite bus 116. The decomposing structural payload 40 is shown in perspective in FIG. 4C. The assembled unit (bus structure 30, satellite array 116, and foam 40) is shown in FIG. 4D.

The foam structure 40 shown in FIG. 4C is seen to have a base support 42, a plurality of lateral supports 44, and a top ring 46. The base support 42 provides support at the base of each group 18a, 18b of satellites, as shown in FIG. 4D, wherein two foam structures 40a, 40b are employed, one for each group of satellites. The plurality of lateral supports 44, which attach to an inner support 46, provide lateral support. The foam structures 40a, 40b at least partially surround, or encompass, the payload. Further, lightweight deployable circumferential straps or bands (not shown for clarity) may be employed in conjunction with the decomposing foam as well as other classical mechanical mechanisms known to those familiar with the art to aid in shear loading of the boost flight.

The advantages of the use of sublimating structural payload foam for space applications include:

Weight. Current satellite and space payload materials are 20 to 30 times heavier than expanded organic foams. Weight is directly proportional to cost in delivering hardware into orbit. Currently, it costs approximately $100,000/lb to place hardware into low earth orbit (LEO). It is estimated that the use of decomposing payload foam of the present invention could easily save 200 lbs of payload per orbital boost resulting in a conservative savings of $20,000,000 per shot.

Geometry. Because the existing art space payload structures remain on the satellite throughout its life, they are designed to not interfere with the functional components on the satellite. Functional components are force to hang from cantilevered structural members, resulting in inefficient structural geometry and therefore further increasing the weight of the payload. In using the decomposable foam of the present invention, the foam disappears in space and can therefore be designed to support the functional hardware directly thereby optimizing the material required.

Space Debris. Obviously, less space debris is better. The products of the UV-catalyzed reaction are water, carbon dioxide, and alcohols. Because materials such as aluminum and hard polymers are significantly reduced, so is the resulting space debris when the satellite is old and no longer functional.

Hardware. The use of the sublimating foam is not limited to replacing structural members supporting the satellite as a whole. This foam can be applied on the bus used to carry multiple satellites into orbit on one boost. It can also be used on a component level such as the backbone for solar panels. The use of the sublimating foam transcends throughout space-based products simply on the nature of the problem it solves.

Space-bound components under the boost environment undergo severe mechanical stress. Components, once in space, undergo essentially no mechanical stress. Because of these facts, engineers are forced to design hardware for the worst-case environment. The decomposing payload foam of the present invention packages hardware for the boost environment only, at $1/20^{th}$ the weight penalty of the prior art approach.

Organic foams have been disclosed herein. However, inorganic foams may alternatively be used, or used in doped conjunction with the organic material in order to modify/control/improve the decomposition rate and the strength of the foam composite.

EXAMPLE

An extruded block of polystyrene is placed into an atmosphere-controlled and light-controlled protective chamber having a chamber window. The chamber is back-filled with argon to purge earth atmosphere. The polystyrene is injected with an oxide, such as hydrogen peroxide, aluminum oxide, or sulfur trioxide. Material stability is verified. A vacuum is drawn to simulate space. Material stability is again verified. The chamber window is exposed to high frequency UV light (mercury-vapor lamp simulating low wave UV). Material stability is again verified. The chamber window is exposed to low frequency UV light. Sublimation of the foam is observed.

The above experiment was done minus the vacuum. Hydrogen peroxide bath was used. A mercad-vapor lamp was used. The material decomposed in seconds under the mercury light source.

INDUSTRIAL APPLICABILITY

The use of decomposable foam is expected to find use in protecting payloads during launch.

What is claimed is:

1. A payload for launching into space by a vehicle, said payload contained within said vehicle and at least partially surrounded by a high energy catalyzed sublimating structural foam decomposable into post-reactive by-products comprising alcohols, carbon dioxide, and water by high energy electromagnetic radiation that is less than about $10^{-7}$ meters, said sublimating structural foam including a free radical initiator.

2. The payload of claim wherein said high energy electromagnetic radiation is ultraviolet radiation.

3. The payload of claim 2 wherein said high energy electromagnetic radiation is low wave ultraviolet radiation of less than 290 nanometers.

4. The payload of claim 1 wherein said decomposable foam comprises a polymer selected from the group consisting of expanded polystyrenes, extruded polystyrenes, polyethylenes, polypropylenes, propylene copolymers, and polyurethanes.

5. The payload of claim 1 wherein said free radical initiator is selected from the group consisting of aluminum oxide, hydrogen peroxide, sulfur trioxide, sulfur fluoride, nitrous oxide, benzil dimethyl ketal, benzoyl peroxide, di-iso-propyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-dihydroperoxide, tert-butyl hydroperoxide-90, ammonium persulfate, potassium persulfate, azo compounds, tert-butyl peroxy-2-ethyl-hexanoate, and di(tert-butylcyclohexyl)peroxydicarbonate, and organic peroxides.

6. The payload of claim 5 wherein said azo compounds are selected from the group consisting of 2,2'-azobisiso-butyronitrile, 4,4'-azobis(cyclohexanecarbonitrile), 4,4'-azobis(4-cyano-valeric acid) and 2,2'-azobis(2-methylpropane), and wherein said organic peroxides are selected from the group consisting of dicumyl peroxide, dioctanoyl peroxide, dimyristyl peroxide, dilauroyl peroxide, 1,1-di(tert-butylperoxycyclohexane), tert-butyl peroxydiethylacetate, and cumyl hydroperoxide.

7. The payload of claim 1 wherein said free radical initiator is present in an amount sufficient to initiate decomposition of said decomposable foam upon exposure to said high energy radiation.

8. The payload of claim 1 wherein structural media are embedded within said decomposable foam.

9. The payload of claim 8 wherein said structural media are selected from the group consisting of glass, metal flakes, fibers, plastics, and rubber.

10. A vehicle for launching a payload into space, said payload protected within said vehicle against launching forces by a high energy catalyzed sublimating structural foam that at least partially surrounds said payload, wherein said sublimating structural foam is decomposable into post-reactive by-products comprising alcohols, carbon dioxide, and water by exposure to high energy electromagnetic radiation that is less than about $10^{-7}$ meters, said sublimating structural foam including a free radical initiator.

11. The vehicle of claim 10 wherein said high energy electromagnetic radiation is ultraviolet radiation.

12. The vehicle of claim 11 wherein said high energy electromagnetic radiation is low wave ultraviolet radiation of less than 290 nanometers.

13. The vehicle of claim 10 wherein said decomposable foam comprises a polymer selected from the group consisting of expanded polystyrenes, extruded polystyrenes, polyethylenes, polypropylenes, propylene copolymers, and polyurethanes.

14. The vehicle of claim 10 wherein said free radical initiator is selected from the group consisting of aluminum oxide, hydrogen peroxide, sulfur trioxide, sulfur fluoride, nitrous oxide, benzil dimethyl ketal, benzoyl peroxide, di-iso-propyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-dihydroperoxide, tert-butyl hydroperoxide-90, ammonium persulfate, potassium persulfate, azo compounds, tert-butyl peroxy-2-ethylhexanoate, and di(tert-butylcyclohexyl) peroxydicarbonate, and organic peroxides.

15. The vehicle of claim 14 wherein said azo compounds are selected from the group consisting of 2,2'-azobisiso-butyronitrile, 4,4'-azobis(cyclohexanecarbonitrile), 4,4'-azobis(4-cyano-valeric acid) and 2,2'-azobis(2-methylpropane), and wherein said organic peroxides are selected from the group consisting of dicumyl peroxide, dioctanoyl peroxide, dimyristyl peroxide, dilauroyl peroxide, 1,1 -di(tert-butylperoxycyclohexane), tert-butyl peroxydiethylacetate, and cumyl hydroperoxide.

16. The vehicle of claim 10 wherein said free radical initiator is present in an amount sufficient to initiate decomposition of said decomposable foam upon exposure to said high energy radiation.

17. The vehicle of claim 10 wherein structural media are embedded within said decomposable foam.

18. The vehicle of claim 17 wherein said structural media are selected from the group consisting of glass, metal flakes, fibers, plastics, and rubber.

19. A method for protecting a payload during launch into space, said method comprising:
at least partially surrounding said payload with a high energy catalyzed sublimating structural foam that is decomposable into post-reactive by-products comprising alcohols, carbon dioxide, and water by high energy electromagnetic radiation that is less than about $10^{-7}$ meters, said sublimating structural foam including a free radical initiator; and
decomposing said foam once said payload is in space by exposure to said high energy electromagnetic radiation.

20. The method of claim 19 wherein said high energy electromagnetic radiation is ultraviolet radiation.

21. The method of claim 20 wherein said high energy electromagnetic radiation is low wave ultraviolet radiation of less than 290 nanometers.

22. The method of claim 19 wherein said decomposable foam comprises a polymer selected from the group consisting of expanded polystyrenes, extruded polystyrenes, polyethylenes, polypropylenes, propylene copolymers, and polyurethanes.

23. The method of claim 19 wherein said free radical initiator is selected from the group consisting of aluminum oxide, hydrogen peroxide, sulfur trioxide, sulfur fluoride, nitrous oxide, benzil dimethyl ketal benzoyl peroxide, di-isopropyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-dihydroperoxide, tert-butyl hydroperoxide-90, ammonium persulfate, potassium persulfate, azo compounds, tert-butyl peroxy-2-ethylhexanoate, and di(tert-butylcyclohexyl) peroxydicarbonate, and organic peroxides.

24. The method of claim 23 wherein said azo compounds are selected from the group consisting of 2,2'-azobisiso-butyronitrile, 4,4'-azobis(cyclohexanecarbonitrile), 4,4'-azobis (4-cyano-valeric acid) and 2,2'-azobis(2-methylpropane), and wherein said organic peroxides are selected from the group consisting of dicumyl peroxide, dioctanoyl peroxide, dimyristyl peroxide, dilauroyl peroxide, 1,1-di(tert-butylperoxycyclohexane), tert-butyl peroxydiethylacetate, and cumyl hydroperoxide.

25. The method of claim 19 wherein said free radical initiator is added in an amount sufficient to initiate decomposition of said decomposable foam upon exposure to said high energy radiation.

26. The method of claim 19 wherein structural media are embedded within said decomposable foam.

27. The method of claim 26 wherein said structural media are selected from the group consisting of glass, metal flakes, fibers, plastics, and rubber.

28. The payload of claim 1 wherein said free radical initiator generates an oxygen atom free radical upon exposure to said high energy electromagnetic radiation that causes decomposition of said foam.

29. The vehicle of claim 10 wherein said free radical initiator generates an oxygen atom free radical upon exposure to said high energy electromagnetic radiation that causes decomposition of said foam.

30. The method of claim 19 wherein said free radical initiator generates an oxygen atom free radical upon exposure to said high energy electromagnetic radiation that causes decomposition of said foam.

* * * * *

UNITED STATES PATENT AND TRADEMARK OFFICE
CERTIFICATE OF CORRECTION

PATENT NO. : 7,578,482 B2 Page 1 of 1
APPLICATION NO. : 10/920976
DATED : August 25, 2009
INVENTOR(S) : Quenten E. Duden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 689 days.

Signed and Sealed this

Seventh Day of September, 2010

David J. Kappos
*Director of the United States Patent and Trademark Office*